(12) United States Patent
Kimberly et al.

(10) Patent No.: US 11,203,445 B2
(45) Date of Patent: Dec. 21, 2021

(54) DATA- AND MODEL-DRIVEN INSPECTION OF AUTONOMOUS AIRCRAFT USING AN UNMANNED AERIAL VEHICLE

(71) Applicant: The Boeing Company, Chicago, IL (US)

(72) Inventors: Gregory A. Kimberly, Seattle, WA (US); Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 16/216,765

(22) Filed: Dec. 11, 2018

(65) Prior Publication Data

US 2020/0180791 A1 Jun. 11, 2020

(51) Int. Cl.
*B64F 5/60* (2017.01)
*B64C 39/02* (2006.01)
*G05D 1/00* (2006.01)

(52) U.S. Cl.
CPC .............. *B64F 5/60* (2017.01); *B64C 39/024* (2013.01); *G05D 1/0088* (2013.01); *G05D 1/0094* (2013.01); *B64C 2201/12* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 7,454,255 B1* | 11/2008 | Boskovic | ................. | G05B 9/03 |
| | | | | 180/402 |
| 8,060,270 B2* | 11/2011 | Vian | ...................... | G05D 1/104 |
| | | | | 701/24 |
| 8,775,013 B1* | 7/2014 | Smailus | .................... | B64F 5/60 |
| | | | | 701/31.4 |
| 9,422,055 B1* | 8/2016 | Beckman | .............. | B64C 39/024 |
| 9,738,381 B1* | 8/2017 | Loud | .................... | G05D 1/0094 |
| 10,124,893 B1* | 11/2018 | Aalund | ................. | B64C 39/024 |
| 10,351,236 B1* | 7/2019 | Woodworth | ............ | B64C 27/08 |
| 2012/0136630 A1* | 5/2012 | Murphy | .................. | F03D 80/50 |
| | | | | 702/188 |
| 2012/0300059 A1* | 11/2012 | Stege | ..................... | F03D 17/00 |
| | | | | 348/114 |
| 2015/0197349 A1* | 7/2015 | Tudor | .................. | G01V 5/0008 |
| | | | | 701/34.2 |
| 2016/0291593 A1* | 10/2016 | Hammond | .............. | G01S 17/89 |
| 2016/0337771 A1* | 11/2016 | Di Censo | ............... | H04S 7/301 |

(Continued)

*Primary Examiner* — Thomas E Worden
(74) *Attorney, Agent, or Firm* — Ostrager Chong Flaherty & Broitman P.C.

(57) ABSTRACT

Pre-flight and episodic aircraft inspections to ensure operational safety and effectiveness are made faster, less costly and more effective by utilizing mobile model and data-driven sensor platforms inspecting known-state target vehicles. For autonomous aircraft, an inspection unmanned aerial vehicle (I-UAV) containing sensors inspects a utility unmanned aerial vehicle (U-UAV). Failure and system models of the U-UAV and the flight history of the U-UAV carried in the sensor data captured by the U-UAV's aircraft health management system are combined to guide the I-UAV to appropriately attend to the systems of the U-UAV and to drive the U-UAV systems into target states that will reveal otherwise hidden or latent failures.

15 Claims, 5 Drawing Sheets

(56) References Cited

U.S. PATENT DOCUMENTS

| | | | |
|---|---|---|---|
| 2018/0120196 A1* | 5/2018 | Georgeson | B64D 1/02 |
| 2018/0149138 A1* | 5/2018 | Thiercelin | F03D 80/50 |
| 2019/0098433 A1* | 3/2019 | Shaw | G05D 1/0022 |
| 2019/0166752 A1* | 6/2019 | Sidoti | G05D 1/0094 |
| 2019/0265204 A1* | 8/2019 | Morel | B64F 5/60 |
| 2019/0315482 A1* | 10/2019 | Gu | B64C 39/024 |
| 2020/0124494 A1* | 4/2020 | Solomon | E03B 7/003 |
| 2020/0166938 A1* | 5/2020 | Hafenrichter | F03D 80/50 |
| 2020/0180791 A1* | 6/2020 | Kimberly | B64F 5/60 |
| 2020/0191316 A1* | 6/2020 | Du | G06Q 10/0635 |

* cited by examiner

DATA- AND MODEL-DRIVEN INSPECTION OF AUTONOMOUS AIRCRAFT USING AN UNMANNED AERIAL VEHICLE

BACKGROUND

This disclosure generally relates to systems and methods for inspection of autonomous aircraft, such as unmanned aerial vehicles (UAVs). As used herein, the term "unmanned aerial vehicle" means a vehicle capable of pilot-less flight that may be either remotely controlled, remotely guided, or autonomous, such as capable of sensing the environment and navigating in dependence on sensor feedback.

The safety of flight and operational reliability of aircraft are typically guaranteed by rigorous inspection regimes that are largely pre-calculated into playbook-like processes and are executed by highly trained mechanics. Inspecting airframes using rigid inspection processes takes excessive time, effort and cost, yet reducing inspections in the absence of model and data guidance may not provide desired safety or reliability. Remote inspection uninformed by failure models may be too time-consuming and costly.

Smaller lower-cost platforms demand lower-cost inspections to operate within cost boundaries. New propulsion and autonomy technologies are opening up new categories of aircraft—categories occupied by smaller, less costly aircraft (e.g., UAVs) that are expected to operate in the absence of a high-cost maintenance regime. The conception of new maintenance strategies that avoid high costs would be a beneficial advance in the art of aircraft inspection.

SUMMARY

The subject matter disclosed in some detail herein is directed to systems and methods for inspection of utility UAVs (U-UAVs) using an inspection UAV (I-UAV). As used herein, the term "utility UAV" means a UAV configured to carry passengers, freight, munitions, scientific instruments or other equipment, whereas the term "inspection UAV" means a UAV configured to carry sensors used in non-destructive inspection (hereinafter "NDI sensors"). The method of inspection uses an I-UAV that examines a U-UAV to assess the current state of the U-UAV. To guide the I-UAV, the inspection system uses models of the U-UAV that represent the failure modes of the components and systems of the U-UAV and allow calculation of the probability, implication and presentation of these failure modes in terms of the sensors carried by the I-UAV. Furthermore, the flight history of the U-UAV is carried in terms of the sensor data captured by the U-UAV's airplane health management system. An inspection planning module uses this data in concert with the models of the airplane's components and systems to create inspection plans to guide the I-UAV to provide appropriate attention to the components and systems of the airplane. Furthermore, this information can be used to decide to drive particular components and systems of the U-UAV through particular sets of motions, operations and so forth as part of the plan that the models and data suggest will reveal potentially interesting or otherwise latent anomalies.

In accordance with one embodiment disclosed in some detail below, the inspection processes generated by the inspection planning module may be dynamic and data- and model-driven at different levels. Each inspection plan may be assembled wholly or partially from a backbone set of pre-calculated (at design time) inspection plans that can be flexibly deployed as guided by the models and data. In addition, each inspection plan may be dynamically created (e.g., generated directly by an artificial intelligence planning system) from system and airplane models and data. For example, these fully dynamic processes can be targeted at achieving high levels of operation reliability and low operational cost.

The inspection can be an entirely autonomous process or can be a hybrid process with remote human-in-the-loop (running the inspection process on an iPad or a computer or a virtual reality rig) being guided through the process by system and failure models and operational data Although various embodiments of systems and methods for inspection of utility UAVs using an inspection UAV are described in some detail later herein, one or more of those embodiments may be characterized by one or more of the following aspects.

One aspect of the subject matter disclosed in detail below is a method for inspecting a utility UAV (U-UAV) using an inspection UAV (I-UAV), the method comprising the following operations performed by a computer system: (a) using flight data from the U-UAV and a system behavior and failure model that models nominal and failure behavior of the systems of the U-UAV to identify an event and calculate a probability of the event happening onboard the U-UAV; (b) using an I-UAV sensor model of a sensor carried by the I-UAV to generate a presentation representing a likely failure mode of a system of the U-UAV in terms of sensor output associated with the event; (c) generating an inspection plan for execution by the I-UAV based in part on the presentation; and (d) controlling the I-UAV to operate in accordance with the inspection plan. In accordance with one embodiment, the method described in the immediately preceding paragraph further comprises generating a demonstration plan representing a course of action to be taken by the U-UAV that is likely to manifest symptoms associated with the event, wherein operation (c) comprises generating an inspection plan for execution by the I-UAV based in part on the presentation and based in part on the demonstration plan. The course of action to be taken by the U-UAV comprises operating a component of the U-UAV in an operational state specified by the demonstration plan. The method may further comprise: converting the demonstration plan into component control signals for controlling the component of the U-UAV; and controlling the component of the U-UAV in accordance with the component control signals to operate in the operational state specified by the demonstration plan.

In accordance with another embodiment, the method further comprises using an operational goal model to generate an implication of the significance of the event to the achievement of operational goals, wherein operation (c) comprises generating an inspection plan for execution by the I-UAV based in part on the presentation and based in part on the implication.

Another aspect of the subject matter disclosed in detail below is a method for inspecting a utility UAV (U-UAV) using an inspection UAV (I-UAV), the method comprising the following operations performed by a computer system: (a) using flight data from the U-UAV and a system behavior and failure model that models system behavior and failure of the U-UAV to identify an event and calculate a probability of the event happening onboard the U-UAV; (b) using an I-UAV sensor model of a sensor carried by the I-UAV to generate a presentation representing a likely failure mode in terms of sensor output associated with the event; (c) generating an inspection plan for execution by the I-UAV based in part on the presentation; (d) converting the inspection plan into inspection control signals for controlling the I-UAV and the sensor carried by the I-UAV; (e) controlling the I-UAV in accordance with the inspection control signals to place the sensor in proximity to the U-UAV at a location specified by the inspection plan; and (f) activating the sensor carried by the I-UAV in accordance with the inspection control signals to acquire data while the sensor is at the location specified in the inspection plan.

In accordance with one embodiment, the method described in the immediately preceding paragraph further comprises: generating a demonstration plan representing a course of action to be taken by the U-UAV that is likely to manifest symptoms associated with the event; and using an operational goal model to generate an implication of the significance of the event to the achievement of operational goals, wherein operation (c) comprises generating an inspection plan for execution by the I-UAV based on the presentation, the demonstration and the implication.

A further aspect of the subject matter disclosed in detail below is an inspection system comprising a utility UAV (U-UAV), an inspection UAV (I-UAV) carrying a sensor, and a computer system configured to perform the following operations: (a) using flight data from the U-UAV and a system behavior and failure model that models system behavior and failure of the U-UAV to identify an event and calculate a probability of the event happening onboard the U-UAV; (b) using an I-UAV sensor model of the sensor carried by the I-UAV to generate a presentation representing a likely failure mode in terms of sensor output associated with the event; (c) generating an inspection plan for execution by the I-UAV based in part on the presentation; (d) converting the inspection plan into inspection control signals for controlling the I-UAV and the sensor carried by the I-UAV; (e) controlling the I-UAV in accordance with the inspection control signals to place the sensor in proximity to the U-UAV at a location specified by the inspection plan; and (f) activating the sensor carried by the I-UAV in accordance with the inspection control signals to acquire data while the sensor is at the location specified in the inspection plan.

In accordance with one embodiment, the computer system is further configured to generate a demonstration plan representing a course of action to be taken by the U-UAV that is likely to manifest symptoms associated with the event, and generate an implication of the significance of the event to the achievement of operational goals using an operational goal model. In this case the inspection plan for execution by the I-UAV is generated based on the presentation, the demonstration and the implication.

Other aspects of systems and methods for inspection of utility UAVs using an inspection UAV are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for inspection of utility UAVs using an inspection UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments discussed in some detail below provide a method for using a small inspection unmanned aerial vehicle (I-UAV) to inspect a utility unmanned aerial vehicle (U-UAV). The I-UAV may be equipped with one or more sensors, such as a camera (e.g., an infrared camera), a microphone for detecting acoustic signatures, or other non-destructive inspection sensor unit (hereinafter "NDI sensor unit). As used herein, the term "acoustic signature" means a series of noises or sounds generated by sound-producing structures and captured or recorded, analyzed, and processed using known acoustic analysis techniques or processes. In the case of a U-UAV, such sound-producing structures may include engines, motors, propellers or rotors, fuel pumps, air conditioning systems.

Figure 1:
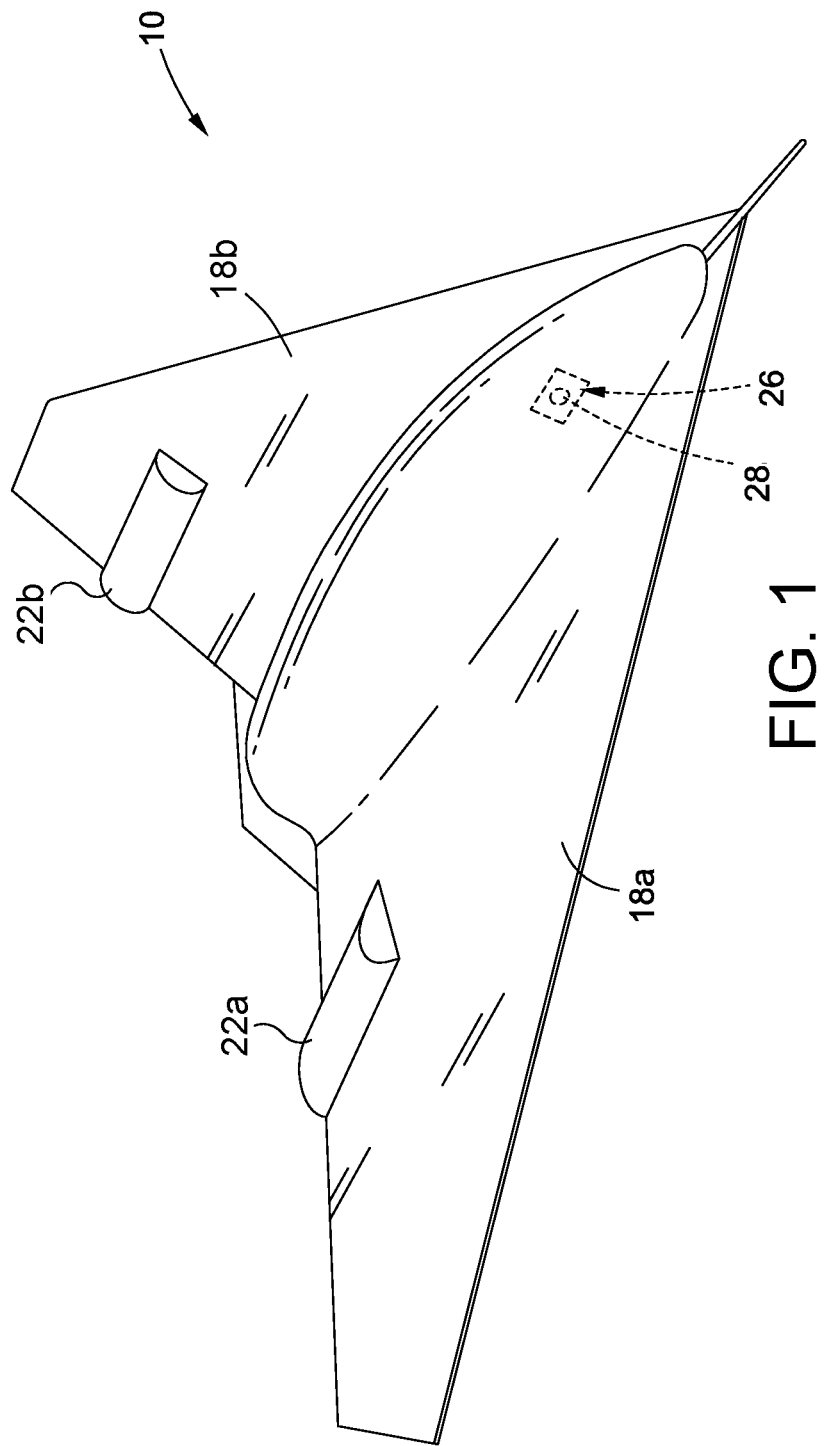
FIG. 1 is a diagram representing a three-dimensional view of one example of a utility UAV having an aircraft health monitoring system onboard.

FIG. 1 is a diagram representing a three-dimensional view of one example of a utility UAV 10 (hereinafter "U-UAV 10") that may be inspected using an inspection UAV. In this example, the U-UAV 10 comprises wings 18a and 18b and engines 22a and 22b. In the alternative, the U-UAV may be a rotorcraft having multiple rotors. The U-UAV 10 may further include control surfaces and actuators (not shown in FIG. 1).

Figure 2:
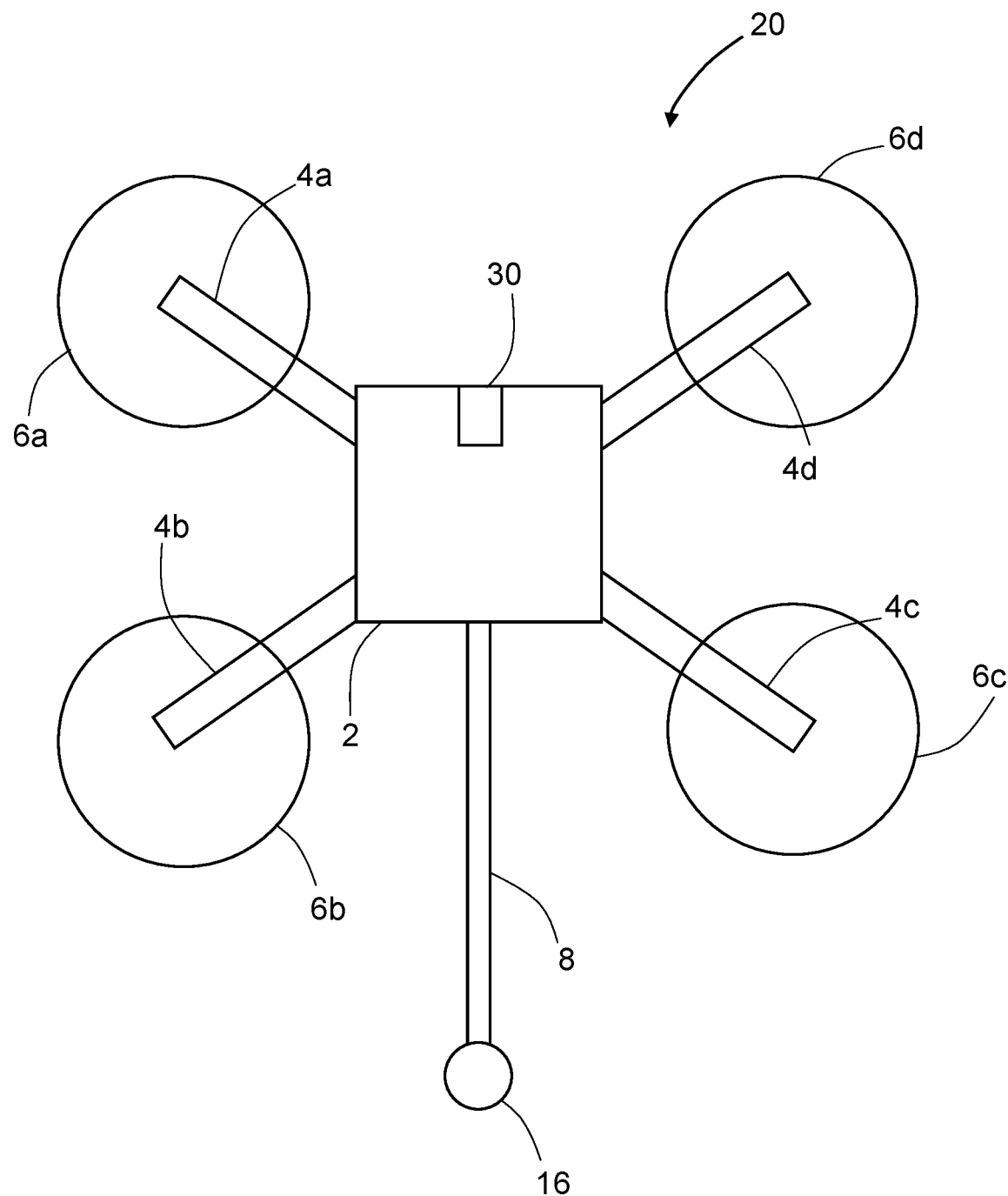
FIG. 2 is a diagram representing a top view of an inspection UAV having a camera and a microphone in accordance with one embodiment.

The U-UAV 10 depicted in FIG. 1 further includes an onboard airplane health management system 26 having a maintenance log 28. Air vehicle health management systems and methods are commonly used to detect faults and to assess the operational health of various systems and structures of air vehicles, such as commercial aircraft, military aircraft, rotorcraft, and other air vehicles. Such health management systems and methods may use sensors to continuously monitor various phenomena during flight such as sound, vibration, pressure, force, and temperature, and to generate data that may be used to warn of any possible problems so that preventive maintenance action may be taken. The air vehicle health management system 26 may be configured to automatically monitor, collect, and transmit service levels using the Aircraft Communications Addressing and Reporting System (ACARS) through an installed Aircraft Condition Monitoring System (ACMS). This includes tire pressure, oxygen pressure, hydraulic fluid, auxiliary power unit, and engine oil levels. The air vehicle health management system 26 may also be configured to provide information regarding fuel efficiency, emission levels, and other performance factors. Airplane health management data (hereinafter "flight data") preferably includes a full set of the above-described data streams The utility UAV 10 depicted in FIG. 1 may be inspected by an inspection UAV 20 (hereinafter "I-UAV 20") of the type shown in FIG. 2. As seen in FIG. 2, I-UAV 20 includes a platform 2 and four rotor support arms 4a-4d which extend outward from the platform 2 in the manner of cantilever beams having one end attached to or integrally formed with the platform 2. The I-UAV 20 further includes four rotors 6a-6d respectively rotatably coupled to the rotor support arms 4a-4d. The motors for driving rotation of the rotors 6a-6d are not shown in FIG. 2 (but see rotor motors 42 in FIG. 3).

In accordance with one proposed implementation, the I-UAV 20 further includes a boom arm 8 having one end attached to or integrally formed with the platform 2. A microphone 16 is mounted to a distal end of the boom arm 8. Any electrical connection or wiring necessary to operatively couple the microphone 16 to an acoustic receiver (not shown in FIG. 2, but see acoustic receiver 32 in FIG. 3) onboard the I-UAV 20 may be provided along or within boom arm 8. In addition or in the alternative, a vibration detector (e.g., an accelerometer) may be mounted to the distal end of the boom arm 8 for detecting vibrations in a portion of a U-UAV 10 contacted by the accelerometer. In addition, a video camera 30 (e.g., an infrared camera) is mounted to the platform 2. I-UAV 20 may be equipped with additional NDI sensors such as ultrasonic transducers, an eddy current detectors and directed-radiation sensors (lidar, sonar, radar, X-ray).

Inspections may be performed following an episode as well as before every flight of the U-UAV 10. The U-UAV 10 may be on ground or in flight or both during inspection. For example, the I-UAV 20 depicted in FIG. 2 may land on a surface of the U-UAV 10 depicted in FIG. 1 to observe for fault indications during flight. In alternative scenarios, inspections may occur before certain selected flights, the selection being driven by models and flight data. In accordance with a further alternative method of inspection, the I-UAV 20 may fly in tandem with the U-UAV 10 at a separation distance. If the U-UAV 10 is on the ground, then the I-UAV 20 may move to a location in proximity to the U-UAV 10 and land at that location or land on the U-UAV 10. In accordance with a further alternative inspection method, the I-UAV 20 may fly around the U-UAV 10 while the U-UAV 10 is on the ground. Another ground variant would be when the U-UAV 10 is taxiing and the I-UAV 20 is orbiting around it to capture manifestations of faults that may be exhibited during that flight mode. The distance (if any) separating the I-UAV 20 from the U-UAV 10 during an inspection will depend on the inspection method being used. The I-UAV 20 may be contained in the U-UAV 10 or in a maintenance facility when not in inspection mode.

The I-UAV 20 may be fully or partially autonomous or remotely piloted during an inspection. In the alternative, the I-UAV 20 may be controlled using a combination of autonomy and remote control, e.g., an autonomous general inspection phase followed by a specific remotely guided phase to inspect areas of interest discovered in the general inspection phase.

A multiplicity of I-UAVs may be deployed to form an inspection "swarm". When the I-UAVs reach the U-UAV to be inspected, each I-UAV begins acquiring NDI sensor data for the portion of the structure which that UAV has been designated to inspect. There may be multiple I-UAVs at any given maintenance site, which may contain heterogeneous sensor sets. In one proposed implementation, the I-UAVs transmit their acquired NDI sensor data to a control station via their transceivers 38 and antennas. Alternatively the I-UAVs could each store their acquired NDI sensor data in a non-transitory tangible computer-readable storage medium onboard the I-UAV for future downloading once the I-UAV lands. The embodiments of the inspection method disclosed herein may be used to test new U-UAVs at a factory as well as to inspect U-UAVs in operation.

Figure 3:
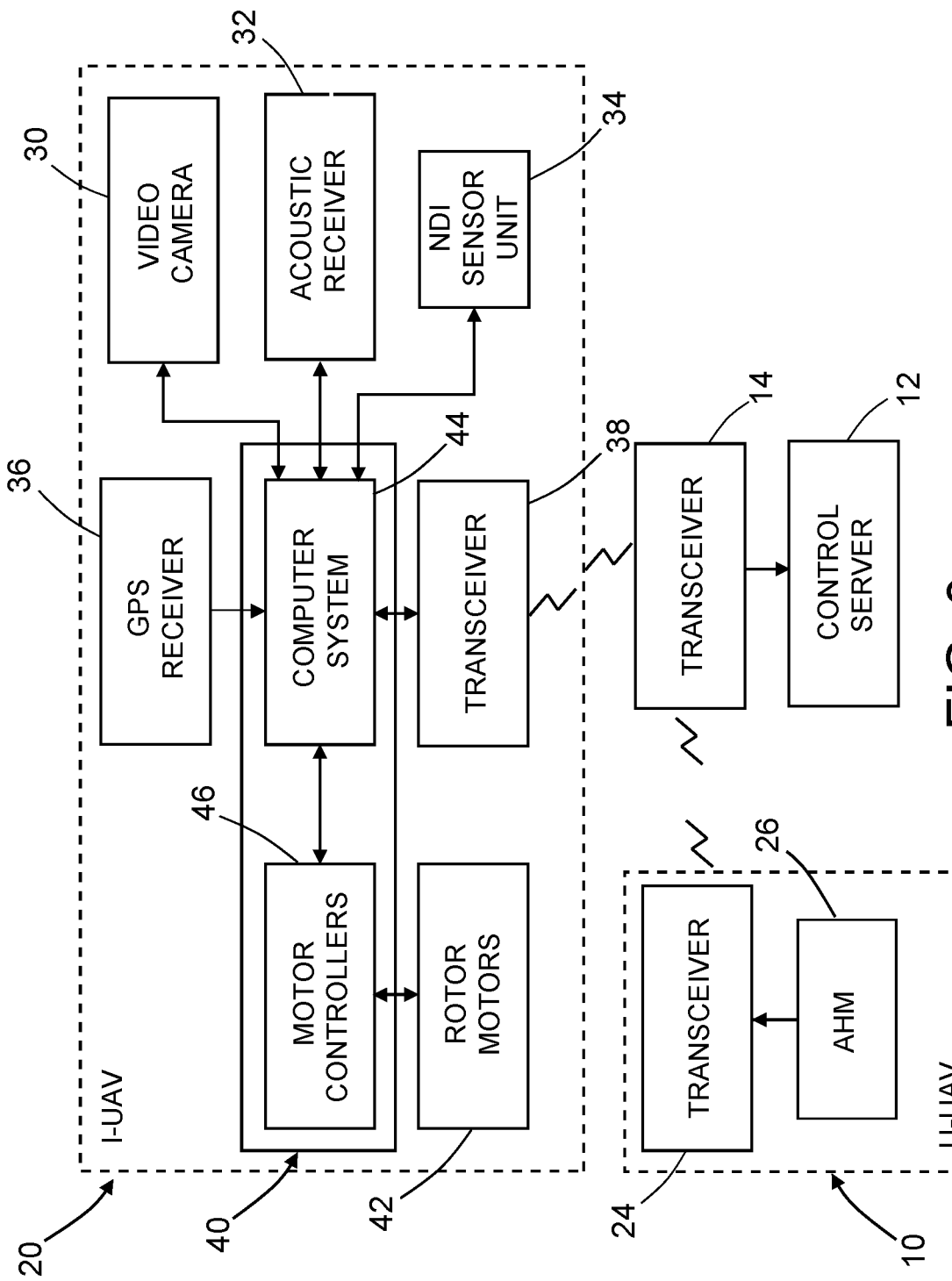
FIG. 3 is a block diagram identifying some components of a system for inspection of utility UAVs using an inspection UAV in accordance with one embodiment.

FIG. 3 is a block diagram identifying some components of a system for inspection of a U-UAV 10 using an I-UAV 20 in accordance with one embodiment. The I-UAV 20 executes an inspection plan under the control of a control server 12. The control server 12 is configured to generate an inspection plan for inspecting the U-UAV 10 based on various factors, including flight data received from the U-UAV 10, and then control the I-UAV 20 as the I-UAV 20 executes the inspection plan against the U-UAV 10. The control server 12 may be a single central processing unit (CPU). In the alternative, the control server 12 may consist of a distributed system of computers or processors. In a distributed system, each of the control computers may be situated locally (in proximity to the U-UAV 10) or remotely (not in proximity to the U-UAV 10) or a combination of local and remote sites. The control server 12 depicted in FIG. 3 is located on the ground. (In alternative embodiments of the inspection method, the control server 12 may be onboard either the U-UAV 10 or the I-UAV 20.)

In the example depicted in FIG. 3, the ground station where the control server 12 resides includes a transceiver 14 for communicating with a transceiver 24 onboard the U-UAV 10 and a transceiver 38 onboard the I-UAV 20. Thus the control server 12 is able to receive U-UAV flight data from the airplane management system 26 onboard the U-UAV 10, generate a U-UAV inspection plan for execution by the I-UAV 20 based on the U-UAV flight data and various models (described in some detail below), transmit inspection control signals to a controller 70 onboard the I-UAV 20 for controlling execution of the inspection plan by the I-UAV 20, and transmit component control signals for controlling a component of the U-UAV 10 to operate in a specified operational state during the inspection. The inspection plan may include flight instructions for enabling the I-UAV 20 to a desired location relative to the U-UAV 10 and data acquisition instructions for activating various NDI devices, such as a video camera 30, an acoustic receiver 32 and an NDI sensor unit 34 of a different type (for example, a radiation detector such as an ultrasonic transducer or an eddy current detector).

The controller 70 onboard the I-UAV 20 controls the operation of rotor motors 42 in accordance with inspection control signals received from the control server 12. In the embodiment shown in FIG. 3, the controller 70 includes a computer system 44 and a plurality of motor controllers 46. The computer system 44 is configured with a software module that controls I-UAV flight. The computer system 44 also receives information from a GPS receiver 36 and calculates the location of the UAV 20 using programmed flight parameters and algorithms. The computer system 44 controls the flight of the I-UAV 20 by sending commands to the motor controllers 46 which respectively control the rotation of rotor motors 42. The motor controllers 46 may take the form of electronic speed control circuits configured to vary an electric motor's speed, direction and braking.

After the I-UAV 20 has been properly positioned such that the U-UAV 10 is within range of the NDI device to be used in the inspection, the computer system 44 activates that NDI device in accordance with the inspection plan. For example, the video camera 30 operates under the control of the computer system 44. More specifically, the video camera 30 may be activated by the computer system 44 to acquire an image and then send the image data back to the computer system 44 for storage and later transmission to the ground. For example, the video camera 30 may be an infrared camera capable of capturing image data containing information concerning temperature variations on the surface of the U-UAV 10.

Figure 4:
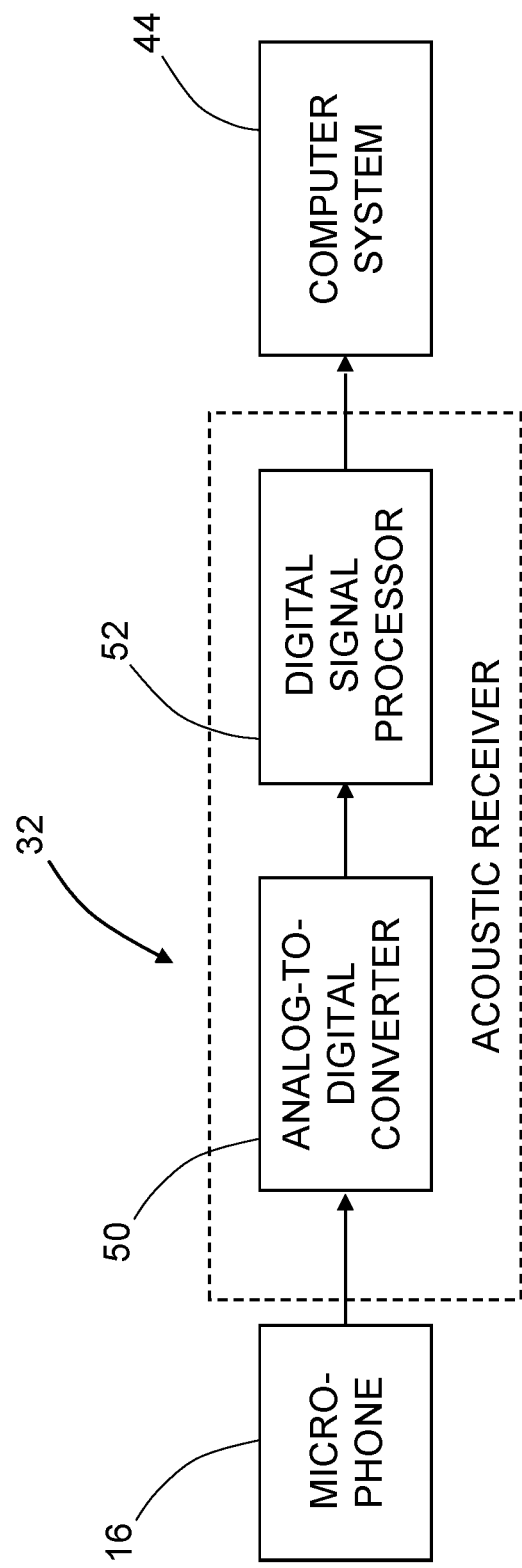
FIG. 4 is a block diagram identifying some components of the acoustic receiver depicted in FIG. 4.

Similarly, the acoustic receiver 32 may be activated to collect acoustic data from the U-UAV 10 at a specific inspection location. FIG. 4 is a block diagram identifying some components of an acoustic receiver 32 in accordance with one embodiment. The acoustic receiver 32 includes an analog-to-digital converter 50 having an input coupled to the microphone 16 and a digital signal processor 52 that receives digital acoustic data from the analog-to-digital converter 50 and sends the processed acoustic data to the computer system 44 for transmission or storage. The acoustic receiver 32 may further include an acoustic filter (not shown in FIG. 4) for filtering unwanted sounds from the acoustic data collected. For example, unwanted sounds may be acoustic data from a part that is known to be working correctly that is next to a part that is malfunctioning and for which acoustic data collection is desired. When the I-UAV 20 has landed safely on or near the U-UAV 10 and is configured to use an acoustic sensor (e.g., microphone 16 shown in FIG. 2), the I-UAV 20 may turn off the motors which drive rotation of the rotors (which rotors typically produce a lot of acoustic noise) to improve the signal-to-noise ratio at the acoustic sensor. The computer system 44 may be configured to control the transmission of acoustic data acquired by the acoustic receiver 32 to the control server 12. Each specific location where acoustic data is acquired may be part of a larger three-dimensional position matrix.

In the embodiment partly depicted in FIG. 3, the operation of the motor controllers 46, video camera 30, acoustic receiver 32 and NDI sensor unit 34 are controlled by the computer system 44 onboard the I-UAV 20 as a function of radiofrequency commands transmitted by the control server 12. Those radiofrequency commands are transmitted by transceiver 14 on the ground; received by transceiver 38 onboard the I-UAV 20; converted by the transceiver 38 into the proper digital format; and then forwarded to the computer system 44. Conversely, imaging data acquired by the video camera 30, acoustic data acquired by the acoustic receiver 32 and transceiver 38 onboard the I-UAV 20 NDI sensor data acquired by the NDI sensor unit 34 may be transmitted by the transceiver 38 onboard the I-UAV 20, received by the transceiver 14 on the ground and then analyzed and utilized by the control server 12.

The control server 12 is configured with programming for processing flight data received from the U-UAV 10 and programming for processing imaging, acoustic and NDI sensor data received from the I-UAV 20 during an inspection procedure. For example, the control server 12 may host acoustic signature analysis software which is configured to compare acoustic signatures acquired during an inspection to baseline acoustic signatures stored in a database. An analysis of an acoustic signature may reveal developing problems with the rotating components or combustion system of the U-UAV 10. For other motors and gears onboard U-UAV 10, unusual sounds in the operation of electrical motors may indicate issues with linkages or the motors themselves. A variety of known algorithms and analytical techniques may be used to compare the baseline acoustic signature with acoustic signatures acquired during inspection to determine any change in the acoustic state of the operating U-UAV 10.

Figure 5:
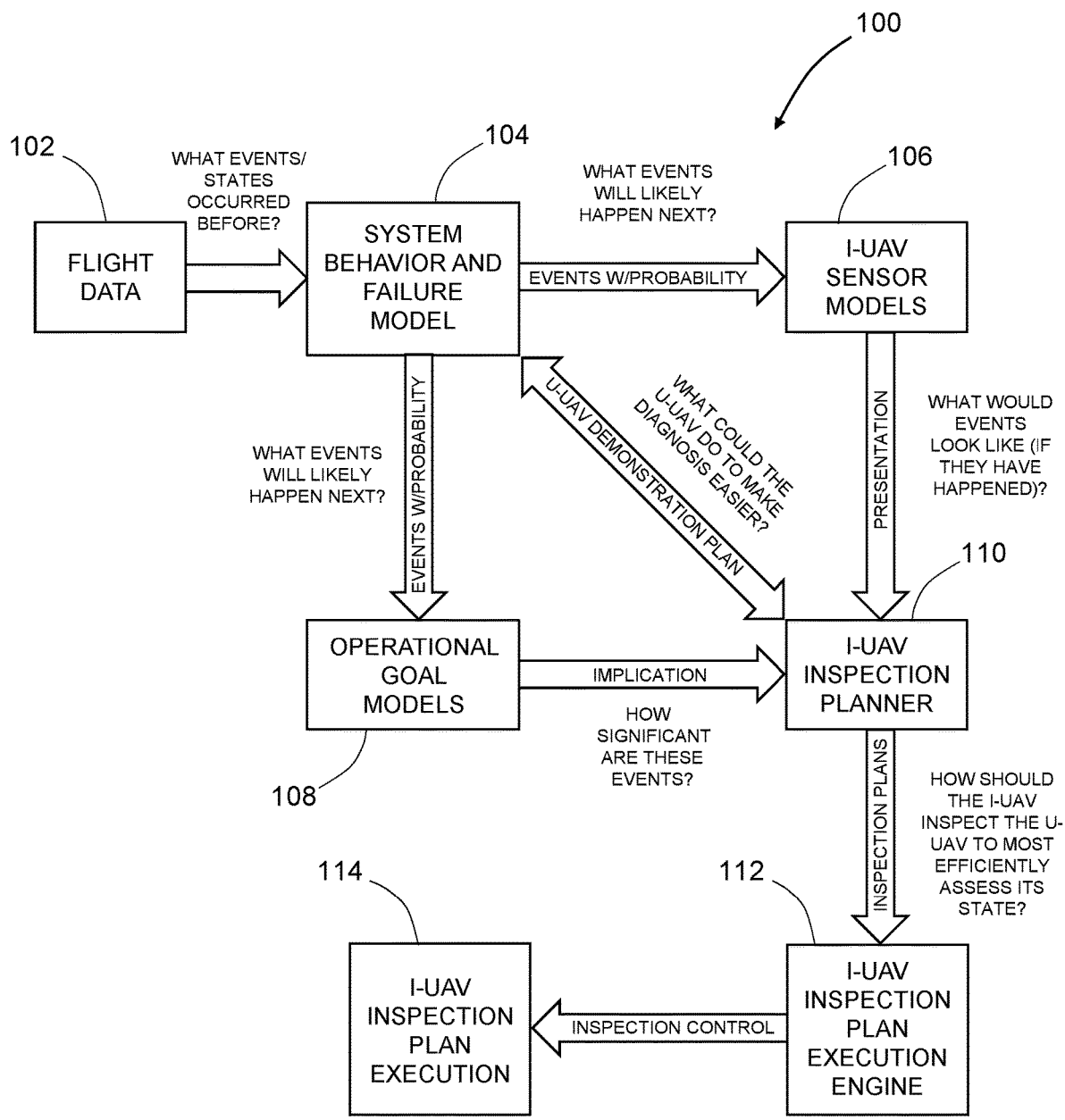
FIG. 5 is a flowchart identifying steps of a method for inspection of utility UAVs using an inspection UAV in accordance with one embodiment.

FIG. 5 is a flowchart identifying steps of a method for inspection of utility UAVs using an inspection UAV in accordance with one embodiment. As previously mentioned, the method of inspection proposed herein controls the I-UAV 20 as the I-UAV 20 conducts an examination of the U-UAV 10 and then assesses the current state of the U-UAV 10 based on the information (e.g., sensor data) obtained by the I-UAV 20. To guide the I-UAV 20, the control server 12 generates control signals for executing an inspection plan. The inspection plan is generated by the control server 12 using the flight data 102 (see FIG. 5) from the U-UAV 10 and various models. These models include: system behavior and failure models of the U-UAV 10 that represent the failure modes of the components and systems of the U-UAV 10; sensor models that represent the expected responses of the sensors carried by the I-UAV 20 to particular events; and operational goal (or mission) models that allow the inspection system to determine the implication of failures and thus to work backward from the functional elements (e.g., a propulsion system) to performance issues of importance to execution of the mission (e.g., transport cargo or people).

Referring more specifically to the various blocks in the flowchart of FIG. 5, the control server 12 includes a system behavior and failure model software module or processor which is configured to use stored U-UAV system behavior and failure models 104 and the flight data 102 received from the U-UAV 10 to identify a particular failure mode and then calculate the probability of the particular failure mode. In particular, the control server 12 is configured to compare the flight data 102 captured by the U-UAV's airplane health management system (representing events and/or states that occurred previous to the inspection) to the system behavior and failure models 104 and then calculate probabilities for consequential events which are likely to occur. The identity and probability of a particular event are then output to respective software modules or processors incorporated in the control server which are responsible for applying I-UAV sensor models 106 and operational goal models 108 to the likely events.

In accordance with one embodiment, the control server 12 further includes a sensor model software module or processor which is configured to use stored I-UAV sensor models 106 to generate a presentation of likely failure modes in terms of the sensors carried by the I-UAV 20. In response to receipt of the identity and probability of the particular event of interest, sensor model software module or processor generates a presentation of what the output from one or more sensors carried by the I-UAV 20 would look like if the particular event were to happen. In other words, the sensor model software module determines what the sensor outputs would be if the event had indeed occurred. The presentation of likely failure modes in terms of the sensors carried by the I-UAV 20 is sent to an I-UAV inspection planner 110.

Thus the inspection system proposed herein relies on models of the sensors carried by the inspection UAV to understand what may and would be observed of the variety of possible failure manifestations. For example, if the failure models include the information that an important failure mode for a hydraulic pump results in the pump heating up anomalously, and therefore causing the area of the U-UAV surrounding the overheated pump to itself overheat, then control server 12 uses the sensor models to determine how to configure and operate the sensors onboard the I-UAV so that a particular failure signature will be detected during the inspection procedure. The sensor models map the capabilities of the sensors in terms of what the sensors are able to detect (e.g., an infrared heat sensor model would be in terms of the infrared heat sensor's ability to detect heat signatures with a given spatial sensitivity and uncertainty).

The control server 12 also includes an operational goal model software module or processor which is configured to use stored operational goal models 108 to estimate the impact of various states of the U-UAV 10 in terms of the system goals, which estimate will be referred to hereinafter as an "implication". The implication is based in part on the event probabilities derived from the system behavior and failure models 104. The operational goal model software module outputs implication data to the I-UAV inspection planner 110. That implication data includes information regarding the significance of the particular event of interest to the achievement of the operational goals. Thus, the operational goal models enable the inspection system to prioritize the inspection process to focus on the most important (from a mission standpoint) of the various component failures onboard the U-UAV 10 which the I-UAV 20 may be able to detect.

As indicated in FIG. 5, a U-UAV demonstration plan is produced by the I-UAV Inspection planner 110 utilizing the U-UAV System Behavior and Failure Model(s) 104. These system models allow the determination of courses of action to be taken by the U-UAV 10 that are likely to manifest symptoms of interest that indicate underlying issues with the U-UAV systems, thereby making diagnosis of a potential problem easier. For example, assume that the flight data 102 indicates that a rotor bearing may be approaching failure. The rotor model (which includes models of the bearing) may indicate that if the rotor in question is spun up to Q rpm, a faulty (or close to faulty) rotor bearing will produce a distinctive sound that the microphone 16 (or other acoustic sensor) on the I-UAV 20 can differentiate from the sound that a healthy bearing would produce. So the demonstration plan for the U-UAV 10 to enable the I-UAV 20 to achieve the desired diagnosis consists of increasing the rotational speed of the rotor to Q rpm while the I-UAV 20 is positioned to place its acoustic sensor appropriately. As previously mentioned, the motors driving rotation of the rotors of the I-UAV 20 may be turned off to eliminate acoustic interference from the I-UAV 20 during acoustic detection of sounds emanating from the U-UAV 10.

The inspection planner 110 may take the form of a software module executable by a general-purpose computer or a dedicated processor incorporated in the control server 12 and programmed to generate an inspection plan. The inspection planner 110 uses the presentation and implication data derived from I-UAV sensor models 106 and operational goal models 108 respectively and the demonstration plan to create inspection plans to guide the I-UAV 20 during an inspection procedure. For example, the inspection plan may be configured such that the I-UAV 20 provides appropriate attention (by means of sensors) to the components and systems of the airplane. Furthermore, this information can be used to decide to drive particular components and systems of the U-UAV 10 through particular sets of motions, operations and so forth as part of the plan that the models and data suggest will reveal potentially interesting or otherwise latent anomalies. Models may be updated during the operational phase by processing additional data gathered (e.g., discovered correlations between observations and future failure modes can be included in future inspections).

Referring again to FIG. 5, the inspection planner 110 generates an inspection plan that specifies the operations to be performed by the sensors onboard the I-UAV 20 and the respective locations of the I-UAV when those operations are conducted. The inspection is then input to an I-UAV inspection plan execution engine 112 residing in the control server 12 or a computer in communication with control server 12. The I-UAV inspection plan execution engine 112 is configured to convert inspection plan data into inspection control signals in a format acceptable to the computer system 44 (see FIG. 3) onboard the I-UAV 20. An I-UAV inspection plan execution software module, residing in the computer system 44, is configured to convert the inspection control signals received from the I-UAV inspection plan execution engine 112 into motor and sensor control signals compatible with the motors and sensors onboard the I-UAV 20. For example, the inspection plan may call for the I-UAV 20 to place a particular sensor at successive locations for acquiring sensor data from the U-UAV 10.

In summary, the inspection planner 110 is configured to generate model- and data-driven dynamic inspection plans using UAVs as inspection devices, driven by system, function and component models of nominal operation and failure modes that include: (a) nominal operation (including models of dependencies upon other components and functions); (b) probability of failure; (c) failure presentation; and (d) failure implication (the implication from a reliability and safety perspective of each failure).

Failure presentation is with respect to each of the potential sensors carried by the I-UAV(s)) (e.g., a component that is overheating during flight may present as a discolored area of paint on a certain part of the surface of the U-UAV). Failure presentation includes models of how the U-UAV can be activated to reveal a given failure or set of failures (e.g., increasing the rotational speed of a rotor up to Q rpm will reveal a pre-failing bearing assembly via a specific audio signature).

The inspection planner is informed by the flight data of U-UAV 10, including performance and characteristics of the vehicle (power output, ground contact, flight speed, etc.) and/or environmental observations (temperature, solar radiation, turbulence, etc.). For example, air vehicles, like all vehicles, operate within some sort of performance envelope—which includes flight speed. The speeds encountered during flight segments will load the structure and propulsion units in ways that can be elucidated by examining design models. For example, assume that a U-UAV 10 that usually cruises at airspeeds ranging from 100 to 200 kilometers per hour has flight data indicating that the U-UAV 10 has been cruising near the upper end of that range for the last X flight hours. By examining the design models, one may discover that such speeds may stress the propulsion unit bearings in such a way that the I-UAV 20 should direct the inspection toward those components. Further examination of the design models could indicate how stressed bearings nearing failure would manifest their condition in some way observable by the sensors on the I-UAV 20 (and perhaps some mode of operation for the U-UAV 10 that would make that manifestation easier for the sensors on the I-UAV 20 to observe—e.g., by increasing the rotational speed of the propulsion units to some specific rpm value).

For an example of a situation in which solar radiation would provide information used to design an inspection plan, assume that the U-UAV 10 has a skin made of a lightweight material—a material which may be discolored somewhat by exposure to bright sunlight over time. If the U-UAV 10 in question has spent a considerable amount of time in a high-sunlight condition, then one may take that datum into account while looking for discolorations due to other causes. For instance, assume the inspection planner 110 generates an inspection plan to look for signs of internal over-temperature conditions on components which are in proximity of the skin—so that their higher than nominal temperatures may discolor the skin. The inspection plan may be configured to take into account the previous exposure of the skin to the Sun when ascertaining a baseline skin color for the overheating component to further perturb.

The above-described models and the U-UAV flight data are used to dynamically produce inspection plans that are executed by the I-UAVs. These inspection plans can either be assembled from component plans or fully dynamic.

The design of the I-UAVs is guided by the design models of how failure modes present themselves. The designer determines what parameters should be monitored given the Fault Detection Isolation and Recovery (FDIR) models. For example, if important failures have audible signatures (of a certain frequency and volume) as their main presentation, the I-UAV(s) should contain acoustic sensors that can detect audio signals of this type. Additionally, the I-UAV capabilities can play a role in the FDIR models themselves—they can be part of the assumed sensor set for the design time FDIR models.

Thus the system and method of inspection proposed herein involve dynamic creation of inspection plans based on failure models and flight data. For example, assume the following facts. An autonomous ten-person quadcopter (the U-UAV) has been in service for several hundred flight hours. It is located at a staging location where inspection UAVs are present. During the design of this U-UAV, models were created of the systems that make up the platform—in particular, models of the rotors and their drive components (such models are increasingly created during the design process as a matter of course). These models capture both nominal and failure behavior of the components and the system having the components. The U-UAV also records sensor data during flight. Over the last several hours of flight, a sensor attached to a rotor bearing has detected higher than usual vibration, but these vibration signals themselves are not sufficient to indicate whether the rotor bearing will fail prematurely.

The inspection planner 110, however, uses the design models of the rotor and associated components to determine that if the rotor were pulsed rapidly while the U-UAV is on the ground, the sound emitted by the rotor plus the existing flight data will be sufficient to determine the health of the bearing within acceptable levels of certainty. No sound sensor exists on the U-UAV, but an appropriate one does exist on the I-UAV. [This may be the case because the sound sensor would not have been able to get a clear signal from inside the UAV or because of cost or weight considerations at design time. Relocating the sensor to the I-UAV may have been part of the design process.]

Therefore, the inspection planner 110 generates an inspection plan that positions the I-UAV to the side of the rotor where the model indicates the distinguishing sound will be audible to the I-UAV's sensors when the suspect rotor is pulsed [dynamic inspection plan including activating U-UAV systems to exhibit required behavior]. This plan is executed and the failure probability of the rotor bearing is narrowed by an amount that can be determined from the models.

Alternatively, rather than an entirely autonomous inspection plan, the planning module may generate a hybrid plan—one that assumes a human in the loop and relies on the human operator to make judgments at various stages in the inspection plan. This hybrid plan may thus be executed under the guidance of a trained operator (either at the inspection site with the U-UAV—perhaps using an augmented reality view or an iPad or from a distant location via a teleoperation setup).

While systems and methods for inspection of utility UAVs using an inspection UAV have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., a non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the tool-equipped unmanned aerial vehicle to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for inspecting a utility UAV (U-UAV) using an inspection UAV (I-UAV) equipped with a sensor mounted to a distal end of a boom arm, the method comprising the following operations performed by a computer system:
    (a) using flight data from the U-UAV and a system behavior and failure model that models system behavior and failure of the U-UAV to identify an event associated with failure of a component of the U-UAV (component failure event) and calculate a probability of the component failure event happening onboard the U-UAV;
    (b) using an I-UAV sensor model of the sensor carried by the I-UAV to generate a presentation representing a simulated expected output of the sensor were the component failure event to occur;

(c) generating an inspection plan enabling the I-UAV to inspect the U-UAV based in part on the presentation;

(d) converting the inspection plan into inspection control signals for controlling the I-UAV and the sensor carried by the I-UAV;

(e) controlling the I-UAV in accordance with the inspection control signals to place the sensor at a location specified by the inspection plan; and (f) activating the sensor carried by the I-UAV in accordance with the inspection control signals to acquire data from the U-UAV while the sensor is at the location specified in the inspection plan.

2. The method as recited in claim 1, further comprising generating a demonstration plan representing an increase in a rotational speed of a rotor of the U-UAV that is designed to cause the component to manifest symptoms associated with the component failure event, wherein operation (c) comprises generating the inspection plan for execution by the I-UAV based in part on the presentation and based in part on the demonstration plan.

3. The method as recited in claim 2, further comprising using an operational goal model to estimate the impact of the component failure event on a capability to achieve operational goals, wherein operation (c) further comprises generating the inspection plan for execution by the I-UAV also based in part on the estimate.

4. The method as recited in claim 1, further comprising using an operational goal model to estimate the impact of the component failure event on capability to achieve operational goals, wherein operation (c) further comprises generating the inspection plan for execution by the I-UAV based in part on the estimate.

5. The method as recited in claim 2, wherein a rotor motor operatively coupled to the rotor of the U-UAV is operated in an operational state specified by the demonstration plan while the sensor is acquiring data at the location specified in the inspection plan.

6. The method as recited in claim 5, wherein the sensor is capable of detecting sounds and the component of the U-UAV is a bearing that supports the rotor and produces sounds during rotation of the rotor, the method further comprising turning off motors onboard the I-UAV to improve a signal-to-noise ratio at the sensor.

7. The method as recited in claim 1, wherein the sensor is capable of detecting vibrations and the component of the U-UAV produces vibrations during operation of the component.

8. The method as recited in claim 1, wherein the sensor is capable of detecting temperatures and the component of the U-UAV produces variations in temperature during operation of the component.

9. The method as recited in claim 1, wherein the I-UAV sensor model maps capabilities of the sensor in terms of what the sensor is able to detect.

10. An inspection system comprising a utility UAV (U-UAV) comprising a rotor and a rotor motor which is operatively coupled to the rotor, an inspection UAV (I-UAV) comprising a boom arm having a distal end and a sensor mounted to the distal end of the boom arm, and a computer system configured to perform the following operations:

(a) using flight data from the U-UAV and a system behavior and failure model that models system behavior and failure of the U-UAV to identify an event associated with failure of a component of the U-UAV (component failure event) and calculate a probability of the component failure event happening onboard the U-UAV;

(b) using an I-UAV sensor model of the sensor carried by the I-UAV to generate a presentation representing a simulated expected output of the sensor were the component failure event to occur;

(c) generating an inspection plan for enabling the I-UAV to inspect the U-UAV based in part on the presentation;

(d) converting the inspection plan into inspection control signals for controlling the I-UAV and the sensor carried by the I-UAV;

(e) controlling the I-UAV in accordance with the inspection control signals to place the sensor at a location specified by the inspection plan; and (f) activating the sensor carried by the I-UAV in accordance with the inspection control signals to acquire data from the U-UAV while the sensor is at the location specified in the inspection plan.

11. The system as recited in claim 10, wherein the computer system is further configured to generate a demonstration plan representing an increase in a rotational speed of a rotor of the U-UAV that is designed to cause the component to manifest symptoms associated with the component failure event, wherein operation (c) comprises generating the inspection plan for execution by the I-UAV based in part on the presentation and based in part on the demonstration plan.

12. The system as recited in claim 11, wherein the computer system is further configured to perform the following operations:

converting the demonstration plan into control signals for controlling a rotor motor which is operatively coupled to the rotor of the U-UAV; and controlling the rotor motor in accordance with the control signals to operate in an operational state specified by the demonstration plan.

13. The system as recited in claim 12, wherein the computer system is further configured such that the rotor motor operatively coupled to the rotor of the U-UAV is operated in the operational state specified by the demonstration plan while the sensor is acquiring data at the location specified in the inspection plan.

14. The system as recited in claim 10, wherein the computer system is further configured to estimate the impact of the component failure event on a capability to achieve operational goals using an operational goal model, wherein operation (c) further comprises generating the inspection plan for execution by the I-UAV also based in part on the estimate.

15. The system as recited in claim 10, wherein the U-UAV comprises a health management system that acquires the flight data during operation of the U-UAV.

* * * * *